US006755598B2

(12) United States Patent
Rowland et al.

(10) Patent No.: US 6,755,598 B2
(45) Date of Patent: Jun. 29, 2004

(54) MULTI-TOOL BORING HEAD AND PROCESS FOR BORING

(75) Inventors: James E. Rowland, Loveland, OH (US); Vladimir Stepan, Fort Wayne, IN (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 09/957,138

(22) Filed: Sep. 20, 2001

(65) Prior Publication Data

US 2003/0053877 A1 Mar. 20, 2003

(51) Int. Cl.⁷ .............................................. B23B 41/00
(52) U.S. Cl. ...................... 409/287; 408/54; 408/189; 408/224; 408/233; 408/713
(58) Field of Search .......................... 408/1 R, 54, 189, 408/190, 191, 223, 224, 231, 233, 234, 238, 713; 409/287, 244; 407/12, 61; 82/131

(56) References Cited

U.S. PATENT DOCUMENTS

| | | | |
|---|---|---|---|
| 2,630,725 A | * | 3/1953 | Black .......................... 408/224 |
| 3,180,187 A | * | 4/1965 | McFerren ...................... 82/173 |
| 3,213,716 A | | 10/1965 | Getts |
| 4,154,555 A | | 5/1979 | Skrentner ...................... 408/25 |
| 4,181,458 A | | 1/1980 | Roturier ....................... 409/265 |
| 4,294,568 A | | 10/1981 | Lipowsky et al. .......... 409/244 |
| 4,367,992 A | | 1/1983 | Soroka ........................ 409/264 |
| 4,509,236 A | * | 4/1985 | Morita et al. ................ 29/26 A |
| 4,571,129 A | * | 2/1986 | Strand .......................... 408/54 |
| 4,768,904 A | | 9/1988 | Schmid ....................... 409/262 |
| 4,948,305 A | * | 8/1990 | Reiterman .................. 408/224 |
| 4,975,002 A | * | 12/1990 | Kress et al. ................. 408/224 |
| 4,995,766 A | | 2/1991 | Coleman ...................... 407/34 |
| 5,018,411 A | | 5/1991 | La Padura .................... 81/57.5 |
| 5,876,163 A | | 3/1999 | Nemeth et al. ............. 409/307 |
| 6,073,524 A | | 6/2000 | Weiss et al. ................. 82/1.11 |
| 6,135,680 A | | 10/2000 | Szuba et al. ................ 408/224 |

OTHER PUBLICATIONS

Tool and Manufacturing Engineers Handbook, Fourth Edition, vol. 1, Machining, Thomas J. Drozda and Charles Wick, Society of Manufacturing Engineers, 1983, Chapter 3, pp. 25, and Chapter 9 pp. 98 and 99.*

* cited by examiner

*Primary Examiner*—Daniel W. Howell

(57) ABSTRACT

A boring head is disclosed in which a plurality of boring tools provide a plurality of simultaneous cuts to a workpiece. A tool holder supports the plurality of boring tools generally perpendicular to a bore axis, so as to increase the rate of a boring operation.

15 Claims, 6 Drawing Sheets

PRIOR ART

MULTI-TOOL BORING HEAD AND PROCESS FOR BORING

BACKGROUND OF THE INVENTION

The present invention is generally directed to the field of boring tools. The present invention has particular applicability to the field of boring heads of the type used in vertical lathes to produce large diameter bores. The invention is especially useful in producing the bore in the stator yoke of a large electric motor, e.g. a 10,000 hp AC induction motor.

An exemplary stator yoke 10 is shown in FIGS. 1A, 1B, 1C and 1D, as used in the 1100 Frame 10,000 hp AC motor produced by Siemens Energy & Automation, Inc. of Norwood, Ohio. Such a yoke 10 is about 89.8 inches in length and includes a yoke bore 12 of about 38 inches in diameter, machined along an axis extending the length of the yoke 10. Further, the yoke 10 is fashioned with a number of structural ribs 14, preferably six, that support the stator and provide void areas therebetween for cooling ventilation and weight reduction of the assembled motor. In machining, the yoke bore 12 is ground from the surfaces of the ribs 14. Three-eighths (⅜) to one-half (½) inch of material must be removed and the bore 12 must be held to a tolerance of about 0.001. This presents a problem during the boring process since the ribs 14 essentially define a non-continuous "interrupted" surface to be machined.

FIG. 2 illustrates a typical previous-type vertical lathe 20 used in a typical boring operation for a large diameter yoke bore 12. A torque is applied to the lathe 20 which transmits a load to a cutting tool 22 of carbide steel, in order to grind the surfaces of the ribs 14. However, when the cutting tool 22 comes away from the interrupted surface of the ribs 14, the load is abruptly released. As the cutting tool 22 comes in contact with the next rib 14, the load is abruptly reapplied. This interrupted operation results in variable torque and resulting wear and tear upon the lathe motor. Also, the load must be limited to avoid overheating the cutting tool 22, which would reduce tool life and necessitate frequent tool changes, with increased expense and reduced production efficiency. Consequently, the lathe spindle is fed into the work at about 0.0075 inches per revolution, with a spindle rate of about 60 revolutions per minute (RPM), in order to obtain a permissible load on the lathe motor and to minimize wear and tool changes for the cutting tool 22. At this rate, it takes about three hours to cut the yoke bore 12. Thus, the boring process is quite time-consuming, contributing significantly to the production time and thus expense of the product.

SUMMARY OF THE INVENTION

In view of the difficulties and drawbacks associated with previous machining tools and processes, there is therefore a need for a machining tool and process that decreases bore time.

There is also a need for a machining tool and process that decreases tool and machine wear.

There is also a need for a machining tool and process that increases production efficiency.

These needs and others are satisfied by the boring head of the present invention in which a plurality of boring tools provide a plurality of simultaneous cuts to a workpiece. A tool holder supports the plurality of boring tools generally perpendicular to a bore axis, so as to increase the rate of a boring operation.

As will be realized, the invention is capable of other and different embodiments and its several details are capable of modifications in various respects, all without departing from the invention. Accordingly, the drawing and description are to be regarded as illustrative and not restrictive.

DETAILED DESCRIPTION OF THE INVENTION

In order to overcome the drawbacks of the previous-type boring heads and associated processes, the present inventors have contemplated a boring head employing a tool holder 100 for supporting a plurality of boring tools 102 for providing a plurality of simultaneous cuts to a workpiece, e.g. a stator yoke 10. As with the previous-type design, the present tool holder 100 is part of a boring head attached to the spindle of a vertical lathe. Thus, the tool holder 100 supports the plurality of boring tools 102 generally perpendicular to the bore axis, so as to increase the rate of a boring operation, as will be set forth in greater detail below.

Figure 1A:
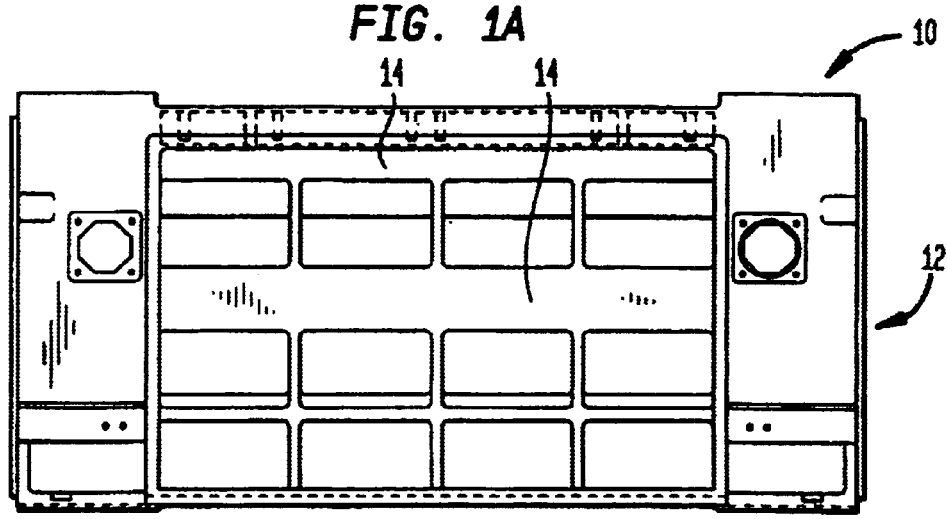
FIGS. 1A, 1B, 1C and 1D are various views showing a stator yoke to be machined according to the present invention.
Figure 1B:
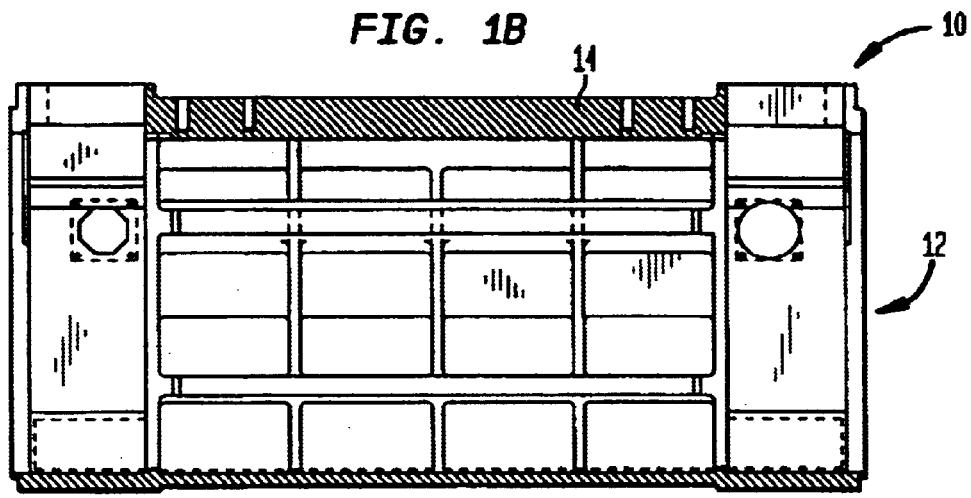
Figure 1C:
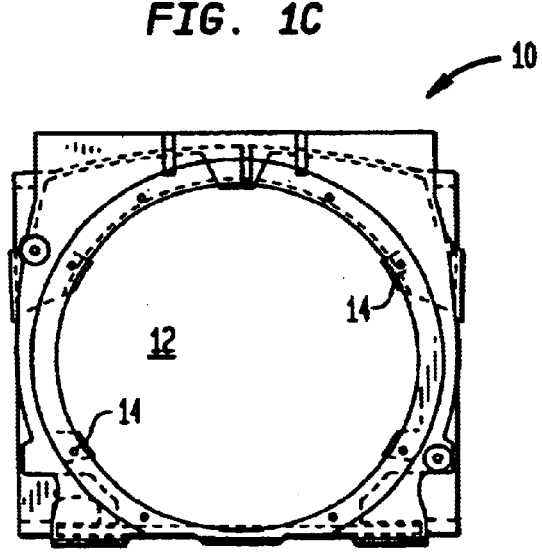
Figure 1D:
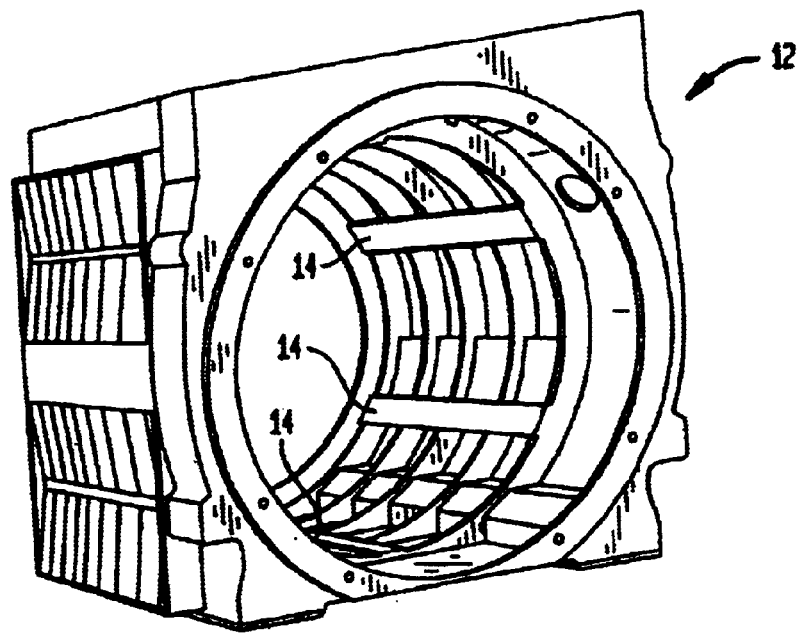
Figure 2:
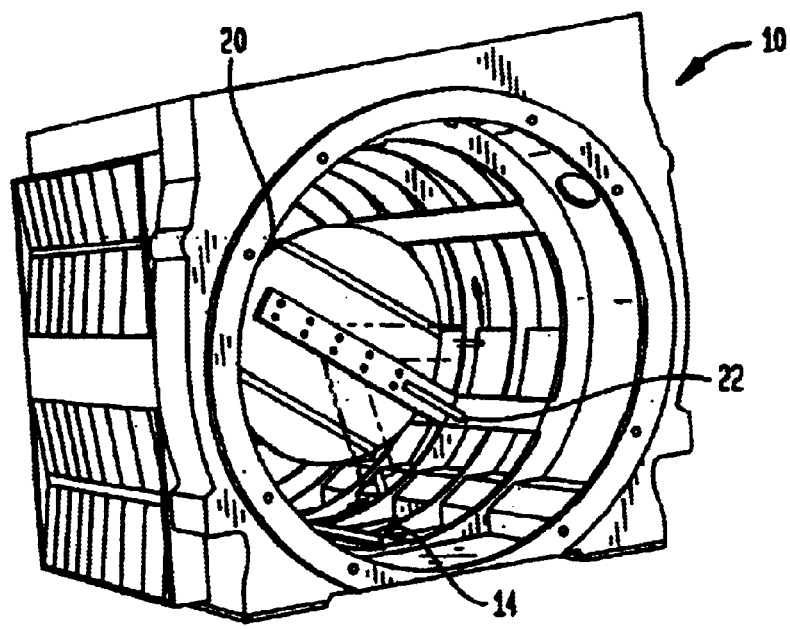
FIG. 2 is the machining operation of a stator yoke using a previous-type boring process.
Figure 3A:
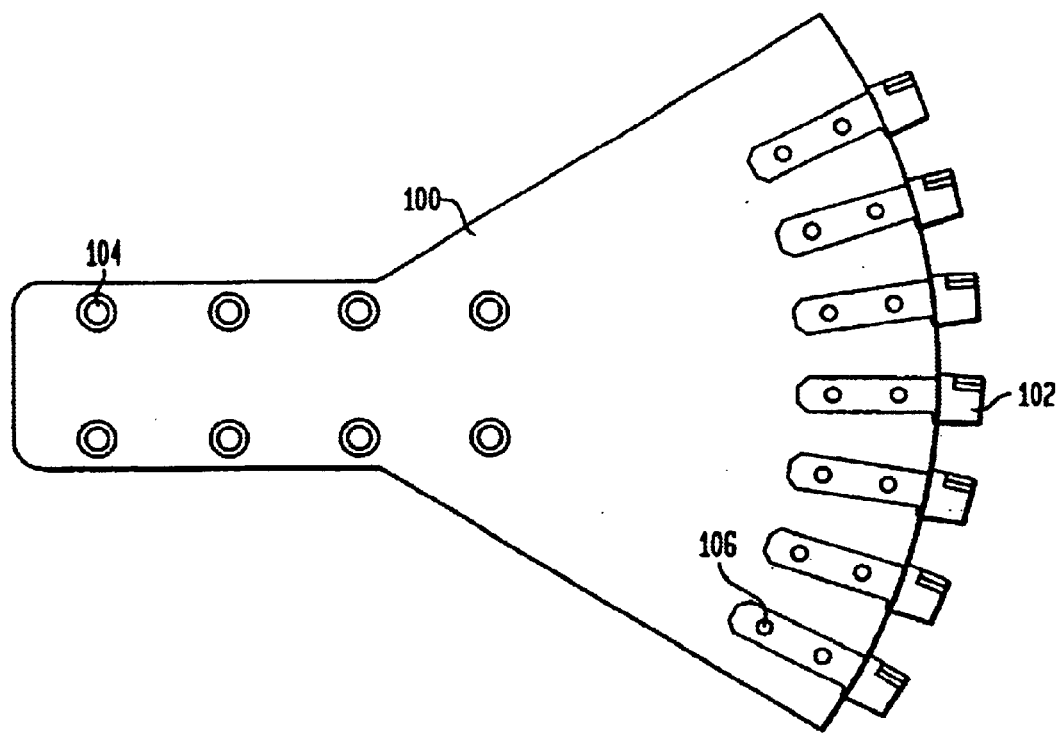
FIGS. 3A, 3B, 3C and 3D are various views showing a tool holder and boring tools in accordance with the present invention.
Figure 3B:
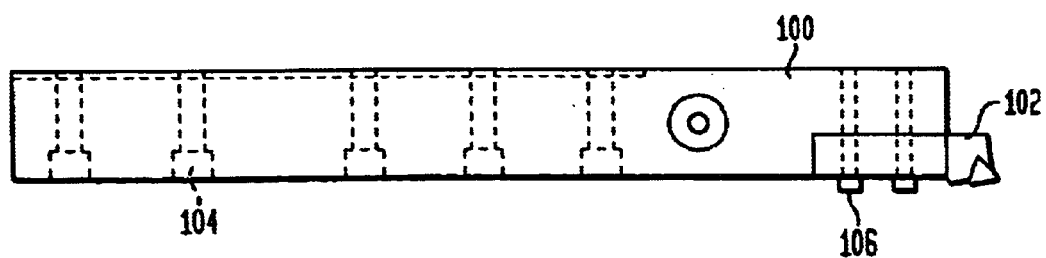
Figure 3C:
Figure 3D:
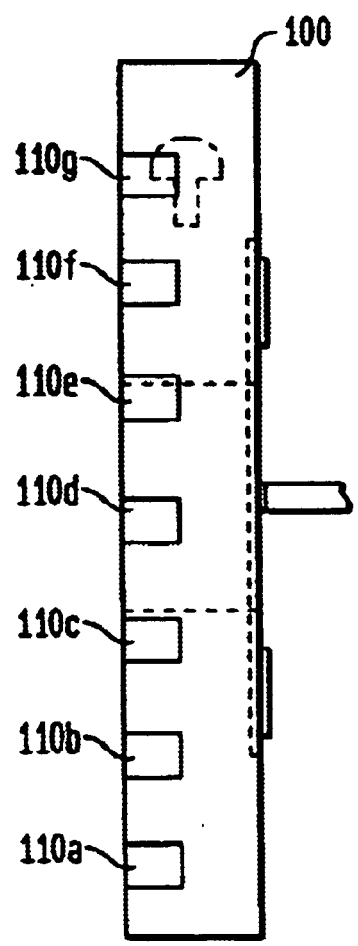

As seen in the top view of FIG. 3A and the side-sectional view of FIG. 3B, the tool holder 100 is secured to the boring head with a plurality of bolts 104. The boring tool 102 is shown in FIG. 3C and bolts 106 are used to secure the tools 102 to the tool holder 100. As shown in FIG. 3D, the tools 102 are held in the tool holder 100 in receptacles 110 having qualified dimensions. The tool holder 100 supports each tool 102 in receptacles 110 having a predetermined offset from each respective other tools. This provides equal loading of the tools 102 against the workpiece during the boring operation. The offset between the tools 102 is in the direction of the bore axis so that the tools 102 are in a stepped configuration. This provides a stepped cutting action during the boring operation.

In the preferred embodiment, the offset is equivalent to the feed rate per revolution of the boring head during the boring operation. For example, the standard feed rate of a previous-type single-tool boring head is 0.075 inches per revolution, operating at a rate of 60 RPMs (revolutions per minute). FIG. 3D shows the tool holder receptacles 110a, b, c, d, e, f, g being stepped with a predetermined offset of 0.075 inches in a tool operating at a feed rate of 0.075 inches per revolution. As shown in the figures, the tool holder 100 supports seven tools 102, where the tools 102 are preferably formed of carbide. However a greater or fewer number of tools 102 and of different type material could be employed without departing from the invention. Each of the seven tools 102 shown in FIG. 3D are stepped so as to have cutting surfaces 0.075 inches apart in height along the direction of the bore axis. The receptacle 110a has a depth of 1.2500 inches and the adjacent receptacle 110b has a depth of 1.2575 inches, stepped to be 0.075 inches deeper than 110a.

In turn, receptacle 110c has a depth of 1.2650 inches, stepped to be 0.075 inches deeper than 110b. Each other adjacent receptacle 110d, e, f, g is in turn 0.075 inches deeper so that receptacle 110g has a depth of 1.2950 inches. When tools 102 are bolted into the receptacles, the tool 102 in receptacle 110a has the highest cutter point above the surface of the tool holder 100, and the tool 102 in receptacle 110g has the lowest cutter point, with each receptacle therebetween stepped in 0.075 inch increments.

Figure 4A:
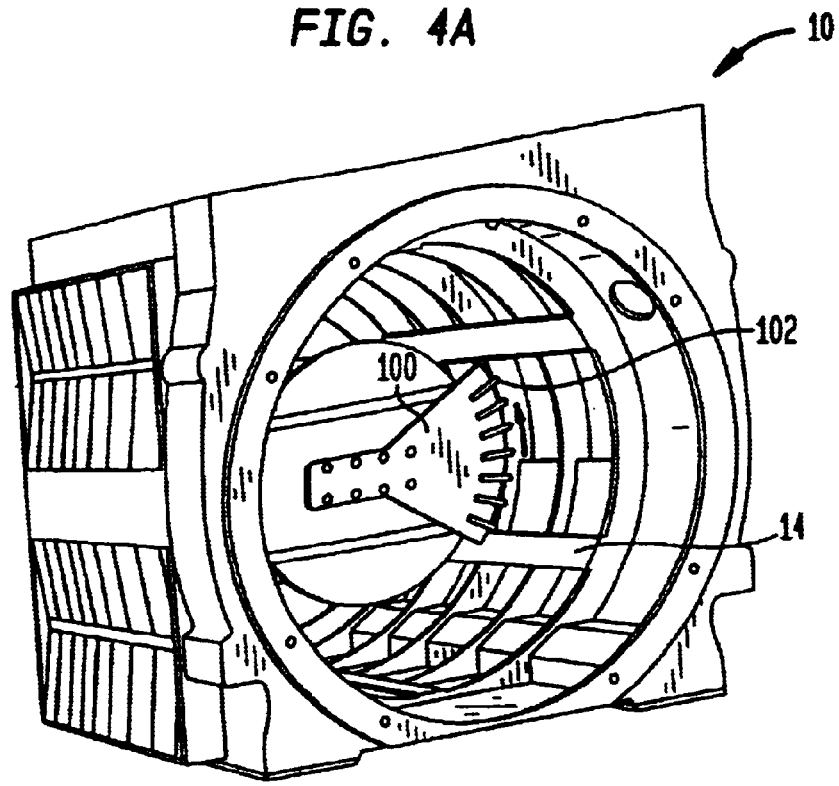
FIGS. 4A and 4B depict the machining operation of the boring process of the present invention.
Figure 4B:
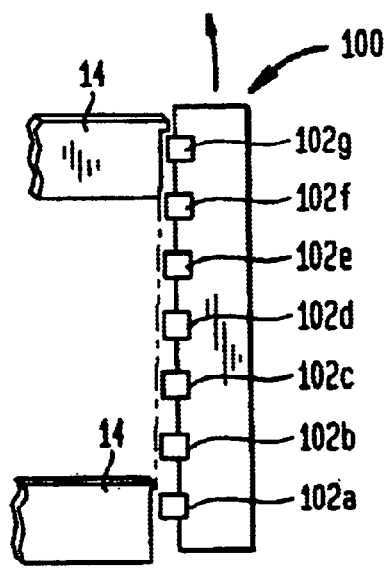

As shown in FIGS. 4A and 4B, as the present tool holder 100 is fed into the stator yoke 10, and rotated in a counter clock wise direction, the tool 102g in receptacle 110g (at the lowest cutting position) is on the leading edge of cutting the yoke bore 12. As the tool holder 100 is rotated, the tool 102g will be fed into the yoke 10 at a feed rate to cut 0.075 inches per revolution. The next lowest tool 102f, supported in receptacle 110f, follows the lowest tool 102g and applies a cut to the workpiece that is stepped 0.075 inches higher, and thus additionally cuts this amount for every tool revolution. Since the steps between the tool cutting points are equal, each tool 102 contacts the yoke 10 with the same load, resulting in even heating and wear on the tools 102, maximizing tool life. As can be seen in FIG. 4B, each subsequent tool 102a, b, c, d, e is stepped 0.075 inches higher, and these tools also cut 0.075 inches of material while providing equal loading on the tools 102. Thus, the present tool cuts with a series of subsequent stepped cuts, and cutting depth per revolution is increased by the number of tools 102 employed. For example, in the preferred embodiment described above, the yoke 10 is cut 7×(0.075) inches or 0.525 inches per revolution, as compared to 0.075 inches with previous tool-types. The invention thus significantly reduces cutting time as compared with standard boring operations.

The present invention can be used to bore out cylindrical bores having smooth, continuous surfaces. However, the invention has special applicability to non-continuous bore surfaces, such as the ribs 14 of a stator yoke 10 of the preferred implementation. As seen in FIGS. 4A and 4B, the present tool holder 100 supports the boring tools 102 at spaced positions configured to maintain at least one tool in operative contact at all times with at least one of the non-continuous ribs 14 to be machined. In this way, the load on the tools 102 is maintained continuously, and is not abruptly released and reapplied, as occurred with the previous-type boring machine. Consequently, the load on the machine can be increased over the allowable level used with previous-type tools. Where a previous-type machine operated at 60 RPMS, the present invention could operate as high as 85+ RPMs, thus increasing the rate of boring per tool by as high as 992%, without overheating the tools 102 and reducing tool life. With the present invention, the bore rate is increased as much as 900% for a stator yoke 10, and bore times with the invention are reduced to 20 minutes, as compared with the three hours for the previous-type boring process. This results in greatly improved efficiency and reduced manufacturing cost.

As shown in the figures, the present tool holder 110 is generally shaped as an arc segment, where the boring tools 102 are supported along the arc segment. The preferred embodiment as shown has been configured to accommodate a stator yoke 10, having six ribs 14 spaced equally around the bore 12 and having centers about 60 degrees apart. However, the invention can be adapted for other discontinuous surfaces along a bore, either greater or lesser in number, having greater or lesser width, and being equally and unequally spaced apart. Such other applications would be satisfied by using a larger or smaller arc segment, and increasing or decreasing the number of tools 102 and the separation therebetween, so as to allow at least one tool to remain in operative contact with at least one bore surface. It should be understood that such variations could be contemplated without departing from the invention. However, it should be appreciated that the tool holder 110 is preferably limited to an arc segment of about 45–90 degrees. As the tool holder 110 approaches a full circle with tools 102 spaced therearound, the required load and spindle torque approaches an impractical maximum in excess of the capacity of the spindle motor. Also, if the workpiece is machined too quickly, it would relieve the desired stress in the workpiece, and the machined surfaces would become unstable and cut off tolerance. Thus, while the present invention would not preclude a full circle tool holder 110, the tool holder and method detailed above approaches an optimization of practical considerations, representing considerable increase in efficiency and reduction in manufacturing expense.

Figure 5:
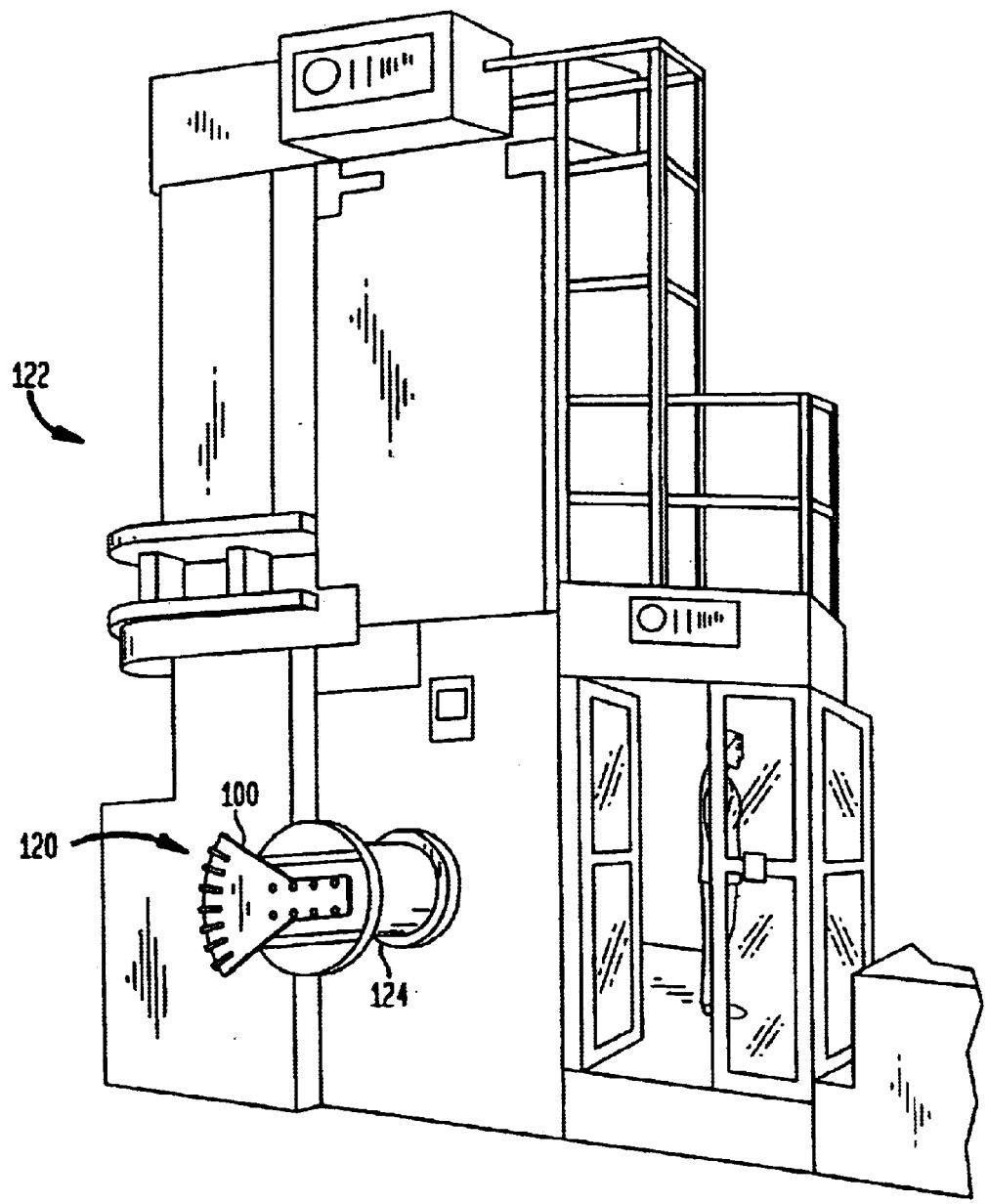
FIG. 5 depicts the tool holder and a boring head in accordance with the invention.

In the preferred embodiment, the present boring head can be employed with any suitable drive system, e.g. a horizontal boring machine of the types used to machine large bores into a desired workpiece such as a stator yoke, as indicated above. In the preferred embodiment, as shown in FIG. 5, the present tool holder 100 is part of a boring head 120 driven by a large boring machine 122, such as a SKODA W150 Horizontal Boring and Milling Machine, manufactured by the SKODA Machine Tool Company of Pilsen, Czech Republic. The boring head 120 is mounted on a 150 mm boring spindle 124 that can be horizontally advanced into the workpiece 10, and is driven using typical components such as are known in the art. This machine 122 operates with a maximum torque on the boring spindle 124 of 7200 Nm with a maximum power output of 50 kW from the electric main motor. Such a large machine 122 includes an operator cab and mechanisms for vertically and horizontally displacing the spindle 124 so as to optimally position the boring head 120. Such a boring machine 122 would form a boring system for implementing the method of the present invention as indicated above. Of course, it should be appreciated that the invention could also be adapted to any type boring application and use a respective boring machine to obtain the benefits disclosed hereinabove, all without departing from the invention.

As described hereinabove, the present invention solves many problems associated with previous type systems. However, it will be appreciated that various changes in the details, materials and arrangements of parts which have been herein described and illustrated in order to explain the nature of the invention may be made by those skilled in the area within the principle and scope of the invention will be expressed in the appended claims.

We claim:

1. A boring system comprising:

a boring head comprising a plurality of boring tools for providing a plurality of simultaneous cuts to a workpiece;

a tool holder for supporting the plurality of boring tools generally perpendicular to a bore axis, so as to increase the rate of a boring operation, the tool holder supports each of the plurality of boring tools at a predetermined offset in the bore axis direction with respect to each respective other tool; and a boring machine for driving the boring head in a boring operation, wherein the tool holder is generally shaped as an arc segment and wherein the plurality of boring tools are supported along the arc segment.

2. A boring head comprising:

a plurality of boring tools for providing a plurality of simultaneous cuts to a workpiece;

a tool holder for supporting the plurality of boring tools generally perpendicular to a bore axis, so as to increase the rate of a boring operation, wherein the tool holder is generally shaped as an arc segment and wherein the plurality of boring tools are supported along the arc segment.

3. The boring head of claim 2, wherein the tool holder supports each of the plurality of boring tools at a predetermined offset in the bore axis direction with respect to each respective other tool, and the predetermined offset in the bore axis direction is provided so that the tools are in a stepped configuration to provide a stepped cutting action during the boring operation.

4. The boring system of claim 1 wherein the plurality of boring tools comprising a means for providing a plurality of simultaneous cuts to a stator yoke for an electric AC induction motor.

5. The boring head of claim 2, wherein the tool holder supports each of the plurality of boring tools at a predetermined offset in the bore axis direction with respect to each respective other tool, and a feed rate per revolution of the boring in the boring operation and the predetermined offset are 0.075 inches.

6. The boring head of claim 2 wherein the plurality of boring tools comprises seven boring tools.

7. The boring system of claim 1 wherein the predetermined offset in the bore axis direction is provided so that the tools are in a stepped configuration to provide a stepped cutting action during the boring operation.

8. The boring head of claim 2 wherein the plurality of boring tools are supported in the tool holder spaced at positions such that at least one tool is always in operative contact with at least one of a plurality of non-continuous surfaces, so as to maintain loading on the tools.

9. The boring head of claim 2 wherein the boring tools are formed of carbide.

10. The boring head of claim 2 wherein the plurality of boring tools comprising a means for providing a plurality of simultaneous cuts to a stator yoke for an electric AC induction motor.

11. The boring head of claim 2 further comprising a boring machine for driving the boring head in the boring operation, wherein the boring head and the boring machine form a boring system.

12. The boring system of claim 1 wherein the plurality of boring tools are supported in the tool holder spaced at positions such that at least one tool is always in operative contact with at least one of a plurality of non-continuous surfaces, so as to maintain loading on the tools.

13. The boring system of claim 1 wherein the boring tools are formed of carbide.

14. The boring system of claim 1 wherein the plurality of boring tools comprises seven boring tools.

15. The boring system of claim 1 wherein a feed rate per revolution of the boring in the boring operation and the predetermined offset are 0.075 inches.

* * * * *